US 8,042,375 B2

(12) United States Patent
Suzuki

(10) Patent No.: US 8,042,375 B2
(45) Date of Patent: Oct. 25, 2011

(54) PRESS DIE CUSHION CONTROLLER

(75) Inventor: Yuichi Suzuki, Komatsu (JP)

(73) Assignee: Komatsu Industries Corp., Komatsu-Shi, Ishikawa (JP)

( * ) Notice: Subject to any disclaimer, the term of this patent is extended or adjusted under 35 U.S.C. 154(b) by 476 days.

(21) Appl. No.: 12/225,461

(22) PCT Filed: Mar. 2, 2007

(86) PCT No.: PCT/JP2007/054026
§ 371 (c)(1),
(2), (4) Date: Sep. 22, 2008

(87) PCT Pub. No.: WO2007/108295
PCT Pub. Date: Sep. 27, 2007

(65) Prior Publication Data
US 2009/0126453 A1    May 21, 2009

(30) Foreign Application Priority Data
Mar. 22, 2006  (JP) ................................ 2006-078768

(51) Int. Cl.
*B21J 9/18*    (2006.01)
*B21D 22/00*    (2006.01)
(52) U.S. Cl. ......................... 72/453.13; 72/16.1; 72/351
(58) Field of Classification Search ................... 72/16.1, 72/16.2, 20.1, 21.5, 350, 351, 453.13
See application file for complete search history.

(56) References Cited

U.S. PATENT DOCUMENTS
| | | |
|---|---|---|
| 2005/0274243 A1 | 12/2005 | Shiroza et al. |
| 2006/0012326 A1 | 1/2006 | Iwashita et al. |
| 2007/0006632 A1 | 1/2007 | Iwashita et al. |
| 2009/0025444 A1 | 1/2009 | Suzuki |

FOREIGN PATENT DOCUMENTS
| | | |
|---|---|---|
| EP | 1 741 500 A1 | 1/2007 |
| JP | 10-192997 A | 7/1998 |
| JP | 10-202327 A | 8/1998 |
| JP | 2006-7296 A | 1/2006 |
| JP | 2006-26738 A | 2/2006 |

OTHER PUBLICATIONS

International Preliminary Report on Patentability issued in Serial No. PCT/JP2007/054026 dated Oct. 21, 2008.
Translation of the Written Opinion of the International Searching Authority issued in Serial No. PCT/JP2007/054026.
U.S. Appl. No. 11/908,485; First Named Inventor: Yuichi Suzuki; Title: "Die Cushion Control Device"; filed Sep. 12, 2007.

*Primary Examiner* — Debra Sullivan
(74) *Attorney, Agent, or Firm* — Holtz, Holtz, Goodman & Chick, P.C.

(57) ABSTRACT

A die-cushion controlling device includes: a position-command-signal outputting section for outputting a position command signal of a die-cushion pad; a position detecting means for detecting a position of the die-cushion pad; a position comparing section for outputting a position deviation signal corresponding to a deviation between the target position value based on the position command signal and a position detection value based on a position detection signal; a position controlling section for outputting a position-speed command signal based on the position deviation signal; a speed controlling section for outputting a motor-current command signal based on the position-speed command signal from the position controlling section; a servo amplifier for generating a current corresponding to the motor-current command signal; and an output switching section that, based on a press signal output when a slide has reached a bottom dead center, switches the position detection signal from the position detection means to the position command signal from the position command signal outputting section.

2 Claims, 12 Drawing Sheets

PRESS DIE CUSHION CONTROLLER

This application is a U.S. National Phase Application under 35 USC 371 of International Application PCT/JP2007/054026 filed Mar. 2, 2007.

TECHNICAL FIELD

The present invention relates to a die-cushion controlling device for a press machine used for drawing or the like, the die-cushion controlling device controlling operations of a die-cushion pad in synchronization with operations of a slide.

BACKGROUND ART

As a die-cushion controlling device for controlling elevating operations of a die-cushion pad driven by a servo motor, a die-cushion controlling device proposed in, for instance, Patent Document 1 has been conventionally known. According to the die-cushion controlling device disclosed in Patent Document 1, a cushion stroke of a die cushion is controlled by a position control until an upper die of a slide contacts a die-cushion pad with a workpiece sandwiched therebetween. On detecting a change in a current of a servo motor when loading starts to be applied on the die-cushion pad, the control is switched from the position control to a pressure control by a detection signal of the current change, so that a preset cushion pressure is applied on the die-cushion pad. Since such a die-cushion controlling device as arranged above can switch the control from the position control to the pressure control, drawing can be favorably conducted.

In a die-cushion controlling device in which a position control and a pressure control are switchable, a control is switched from the pressure control to the position control again when a slide has reached a bottom dead center, so that a die-cushion pad is moved up within a predetermined time after an upward movement of the slide is started so as to return to a stand-by position for the next processing. In addition, when the slide has reached the bottom dead center position, the die-cushion pad is controlled to stop at its own bottom dead center position for a predetermined time (bottom dead center locking) in order to assure that a drawing is reliably conducted to the end.

Patent Document 1: JP-A-10-202327 (page 3)

DISCLOSURE OF THE INVENTION

Problems to be Solved by the Invention

However, it is difficult to stop the die-cushion pad accurately at the bottom dead center position at the timing when the slide reaches the bottom dead center position. In other words, the actual bottom dead center positions of the slide fluctuate because of a plate-thickness error, a processing error or the like of the workpiece. Accordingly, regarding a die-cushion pad that is lowered following the slide, even if a target bottom dead center position is determined at one point, the target position does not coincide with the actual bottom dead center position. Therefore, the bottom dead center locking cannot be accurately conducted.

An object of the present invention is to provide a die-cushion controlling device that stops a die-cushion accurately at the bottom dead center position and securely conducts the bottom dead center locking.

Means for Solving the Problems

A die-cushion controlling device for a press machine according to an aspect of the present invention includes: a position-command-signal outputting section that outputs a position command signal corresponding to a target position value of a die-cushion pad; a position detecting means that detects a position of the die-cushion pad; a position comparing section that outputs a position deviation signal corresponding to a deviation between the target position value based on the position command signal and a position detection value based on a position detection signal from the position detecting means; a position controlling section that outputs a position-speed command signal based on the position deviation signal; a speed controlling section that outputs a motor-current command signal based on the position-speed command signal from the position controlling section; a servo amplifier that feeds an electric servo motor for driving a die cushion with a current corresponding to the motor-current command signal; and an output switching section that, based on a press signal that is outputted at a timing when a slide of the press machine reaches a bottom dead center position, switches the position detection signal from the position detecting means to the position command signal from the position-command-signal outputting section and outputs the position command signal to the position comparing section.

With the aspect of the invention, when the slide reaches the bottom dead center, the die-cushion pad that is lowered following the slide also stops at a bottom dead center of the die-cushion pad. At this time, the bottom dead center position given in the form of a target position value in terms of the position control and the bottom dead center at which the die-cushion pad actually stays may not coincide. Even in such a case, the position detection value at the own bottom dead center position of the die-cushion pad can be put in place of the target position value by the output switching section. This arrangement allows the deviation between the position detection value and the target position value to be followed up to be 0. Accordingly, in actuality and in terms of the position control, the die-cushion pad can be securely positioned at its own bottom dead center position, so that the bottom dead center locking is accurately conducted.

In the above arrangement, the die-cushion controlling device for a press machine preferably further includes: a pressure-command-signal outputting section that outputs a pressure command signal corresponding to a target pressure value; a pressure detecting means that detects a pressure applied on the die-cushion pad; a pressure comparing section that outputs a pressure deviation signal corresponding to a deviation between the target pressure value based on the pressure command signal and a pressure detection value based on a pressure detection signal from the pressure detecting means; a pressure controlling section that outputs a pressure-speed command signal based on the pressure deviation signal; and a position/pressure-control switching section that selects one having a smaller value of the pressure-speed command signal and the position-speed command signal, in which the speed control section outputs a motor current command signal based on the pressure-speed command signal when the pressure-speed command signal is outputted from the position/pressure-control switching section.

With the above arrangement, the pressure comparing section outputs the pressure deviation signal corresponding to the deviation between the target pressure value and the pressure detection value, and the pressure control section outputs the pressure-speed command signal based on the pressure deviation signal. The position comparing section outputs the position deviation signal corresponding to the deviation between the target position value and the position detection value, and the position control section outputs the position-speed command signal based on the position deviation signal.

The position/pressure control switching section constantly monitors and compares the pressure-speed command signal and the position-speed command signal and selects the smaller one. Accordingly, compared to a conventional arrangement in which only an output of a detection signal of the change in current of a servo motor is used for switching, changes in the pressure and the position are accurately obtained, thereby achieving a stable switching. Thus, the operation of the die cushion stabilizes.

In addition, because both the position-speed command signal and the pressure-speed command signal are monitored for switching, faster and more secure switching than a conventional arrangement in which only a current change of a servo motor is monitored can be achieved.

BEST MODE FOR CARRYING OUT THE INVENTION

Next, embodiment(s) of a die-cushion controlling device according to the present invention will be described with reference to the attached drawings.

Figure 1:
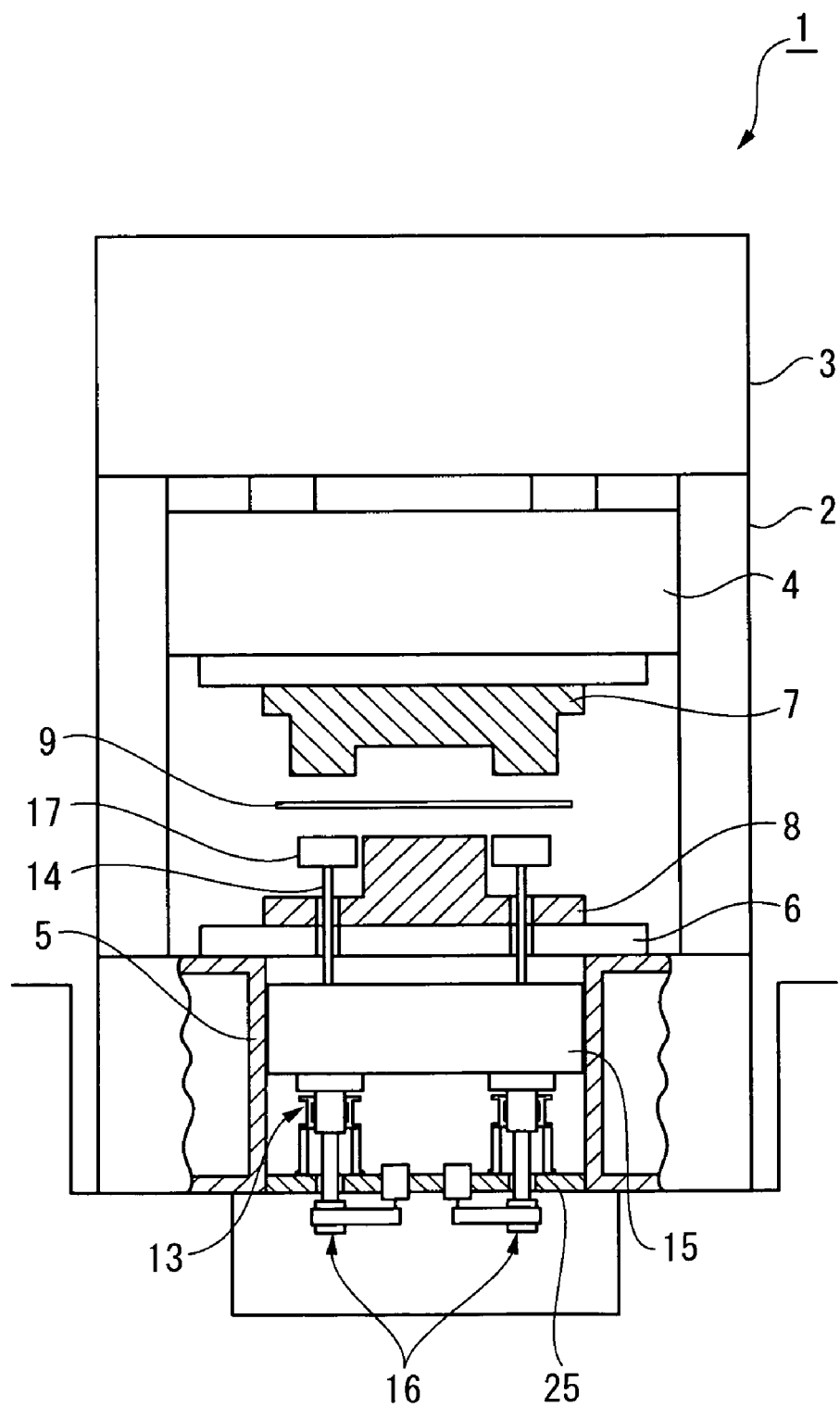
FIG. 1 schematically shows an arrangement of a press machine according to an embodiment of the present invention.
Figure 2:
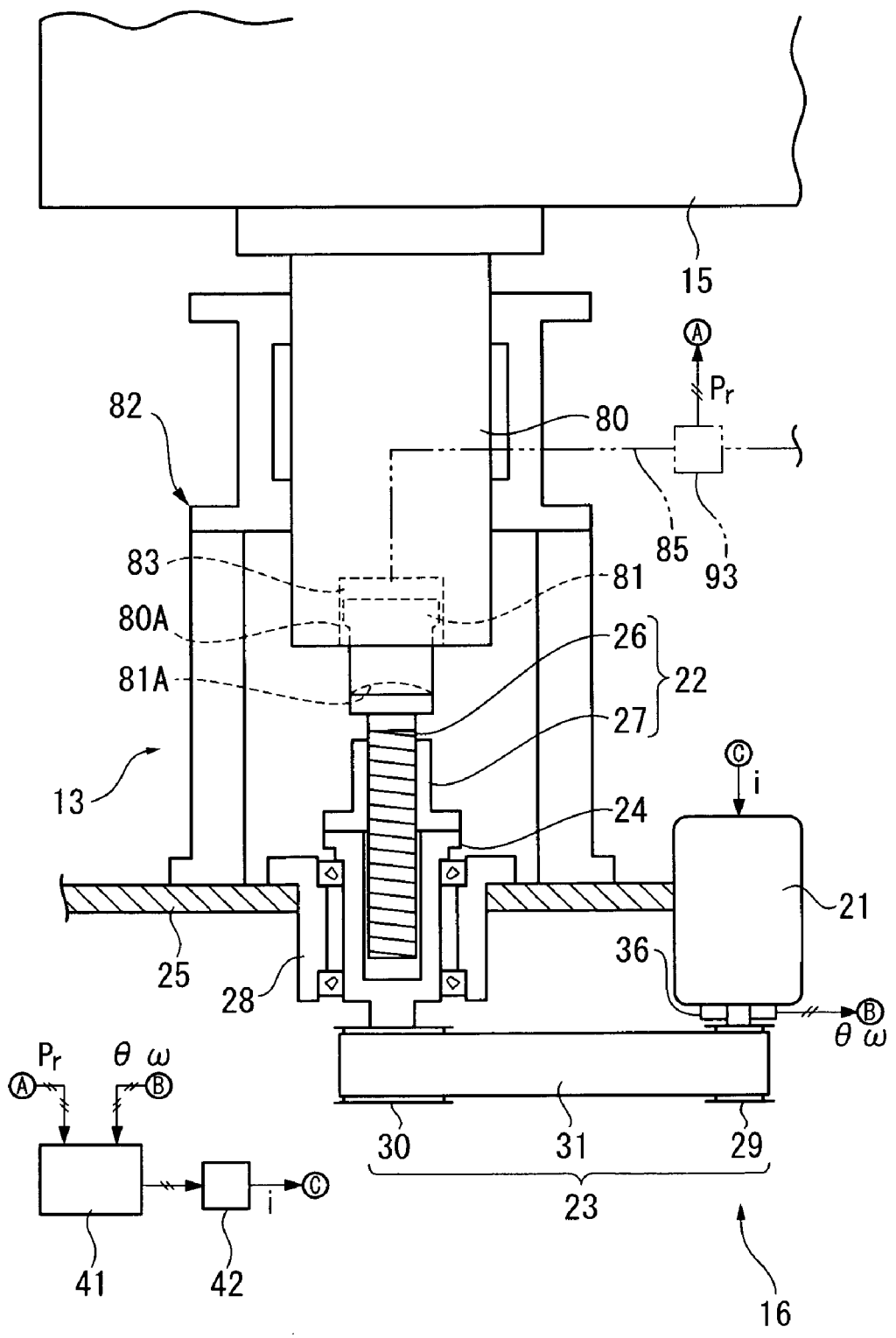
FIG. 2 schematically shows an arrangement of a die cushion according to the embodiment of the present invention.

FIG. 1 schematically shows an arrangement of a press machine according to an embodiment of the present invention. FIG. 2 schematically shows an arrangement of a die cushion 13 according to a first embodiment of the present invention.

A press machine 1 shown in FIG. 1 includes: a slide 4 supported by a body frame 2 to be movable up and down, and driven to move up and down by a slide driving mechanism 3; and a bolster 6 disposed to face the slide 4, and mounted on a bed 5. A lower surface of the slide 4 is attached with an upper die 7 while an upper surface of the bolster 6 is attached with a lower die 8. With this arrangement, a workpiece 9 placed between the upper die 7 and the lower die 8 experiences press work (drawing) with the slide 4 moved up and down.

In the above arrangement, the bed 5 houses a die cushion(s) 13 therein. The die cushion 13 includes: a required die-cushion pin 14; a die-cushion pad 15 supported by the bed 5 to be movable up and down in the bed 5; and a die-cushion-pad driving mechanism 16 for driving the die-cushion pad 15 to move up and down.

The die-cushion pin 14 is inserted in holes formed respectively in the bolster 6 and the lower die 8 in such a manner as to vertically penetrate the bolster 6 and the lower die 8. An upper end of the die-cushion pin 14 abuts on a blank holder 17 disposed in a recessed portion of the lower die 8 while a lower end of the die-cushion pin 14 abuts on the die-cushion pad 15.

One or more guide member(s) (not shown) for vertically guiding the die-cushion pad 15 is provided between lateral surfaces of the die-cushion pad 15 and an inner wall surface of the bed 5 facing the lateral surfaces of the die-cushion pad 15. The one or more guide member(s), which includes a mutually-engageable pair of an inner guide and an outer guide, is attached thereto such that the inner guide is attached to the lateral surfaces of the die-cushion pad 15 while the outer guide is attached to the inner wall surface of the bed 5. In this manner, the die-cushion pad 15 is supported by the bed 5 to be movable up and down within the bed 5.

As shown in FIG. 2, the die-cushion-pad driving mechanism 16 includes: an electric servo motor 21 serving as a driving source; a ball-screw mechanism 22 serving as an elevating means for elevating the die-cushion pad 15; and a wound transmission mechanism 23 and a connecting member 24 provided in a power transmission path lying between the electric servo motor 21 and the ball-screw mechanism 22. According to the arrangement of the die-cushion-pad driving mechanism 16, the die-cushion pad 15 and the electric servo motor 21 can transmit mutual power to each other.

The electric servo motor 21 is a rotary AC servo motor having a rotary shaft, rotary speed and torque of which are controlled by controlling of a motor current i (current) fed to the electric servo motor 21. A body of the electric servo motor 21 is fixed on a beam 25 that bridges the inner wall surfaces of the bed 5. The electric servo motor 21 is additionally provided with an encoder 36 (position detecting means). The encoder 36 detects an angle and angular speed of the rotary shaft of the electric servo motor 21, and outputs the detection values respectively as a motor-rotary-angle detection signal θ and as a motor-rotation-angular speed detection signal ω. The motor-rotary-angle detection signal θ and the motor-rotation-angular speed detection signal co output from the encoder 36 are input to a later-described controller 41.

The ball-screw mechanism 22 includes a screw portion 26 and a nut portion 27 screwed to the screw portion 26, and converts rotary power input from the nut portion 27 into linear power by the screw portion 26 to output the converted power. A lower end of the screw portion 26 is adapted to be advanced into and retracted from a space formed at the center of the connecting member 24 while a lower end of the nut portion 27 is linked to an upper end of the connecting member 24. The connecting member 24 is supported by the beam 25 via a bearing device 28 that includes a required bearing and a bearing housing for housing the bearing.

The wound transmission mechanism 23 is provided by winding a timing belt 31 between a small pulley 29 fixed to the rotary shaft of the electric servo motor 21 and a large pulley 30 fixed to a lower end of the connecting member 24.

With the above arrangement, the rotary power of the electric servo motor 21 is transmitted to the nut portion 27 of the ball-screw mechanism 22 via the small pulley 29, the timing belt 31, the large pulley 30 and the connecting member 24. The rotary power transmitted to the nut portion 27 moves the screw portion 26 of the ball-screw mechanism 22 up and down, thereby driving the die-cushion pad 15 to move up and down. By controlling the motor current i fed to the electric servo motor 21, a biasing force fed to the die-cushion pad 15 is also controlled.

In the die cushion 13, a lower end of the die-cushion pad 15 is connected with a plunger rod 80. A lateral surface of the plunger rod 80 is slidably supported by a tubular plunger guide 82. The plunger guide 82 guides the plunger rod 80 and the die-cushion pad 15 connected to the plunger rod 80 in the elevating direction. A lower portion of the plunger rod 80 is provided with a cylinder 80A having a downward opening, in which a piston 81 is slidably housed.

An inner wall surface of the cylinder 80A and an upper surface of the piston 81 define a hydraulic chamber 83, an inside of which is filled with pressure oil. The hydraulic chamber 83 is disposed coaxially with the plunger rod 80 and the ball-screw mechanism 22. A pressure-oil port of the hydraulic chamber 83 is connected to a hydraulic circuit, such that the pressure oil is transferred between the hydraulic chamber 83 and the hydraulic circuit. The pressure oil of the hydraulic chamber 83 mitigates an impact resulting from a contact of the upper die 7 with the workpiece 9. When the hydraulic pressure is at a predetermined level or higher, the pressure oil is ejected to a tank. The pressure oil of the hydraulic chamber 83 provides protection from an excessive load.

A lower end of the piston 81 abuts on an upper end of the screw portion 26 of the ball-screw mechanism 22. The lower end of the piston 81 is provided with a spherical recessed surface 81A while the upper end of the screw portion 26, which faces the recessed surface 81A, is provided with a spherical projecting surface. Conversely, the lower end of the piston 81 may be provided with a projecting surface while the upper end of the screw portion 26 may be provided with a recessed surface. A rod-like member such as the screw portion 26 is vulnerable to bending moment while being invulnerable to axial forces applied on ends thereof. In an arrangement where the upper end of the screw portion 26 is spherical, even when bending moment is applied on the upper end of the screw portion 26 due to inclination of the die-cushion pad 15, only an axial force is applied on the entirety of the screw portion 26. With such a structure, damages on the screw portion 26 due to eccentric loading can be prevented.

In the die cushion 13, a pressure of the hydraulic chamber 83 is detected within the above-described hydraulic circuit. The port of the hydraulic chamber 83 is communicated with a conduit line 85 for forming the hydraulic circuit. In the middle of the conduit line 85, a pressure gauge 93 (pressure detecting means) is provided. The pressure gauge 93 detects the pressure of the hydraulic chamber 83, i.e., load applied on the die-cushion pad 15. The pressure gauge 93 outputs a pressure detection signal Pr to the controller 41.

Next, an arrangement of a die-cushion controlling device 40 for controlling the die cushion 13 will be described with reference to the functional block diagram of FIG. 3 and the control block diagram of FIG. 4.

Figure 3:
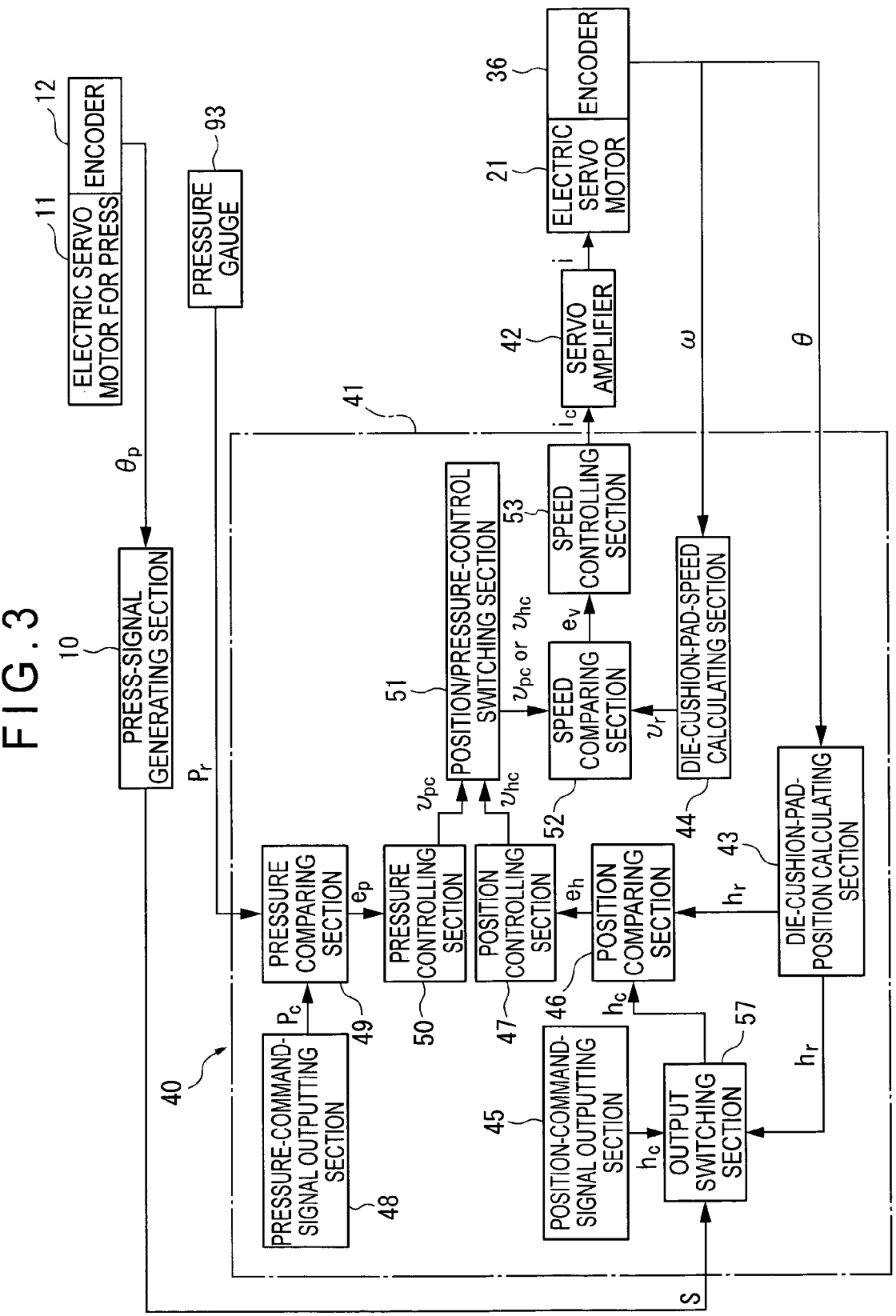
FIG. 3 is a functional block diagram for explaining an arrangement of a die-cushion controlling device.
Figure 4:
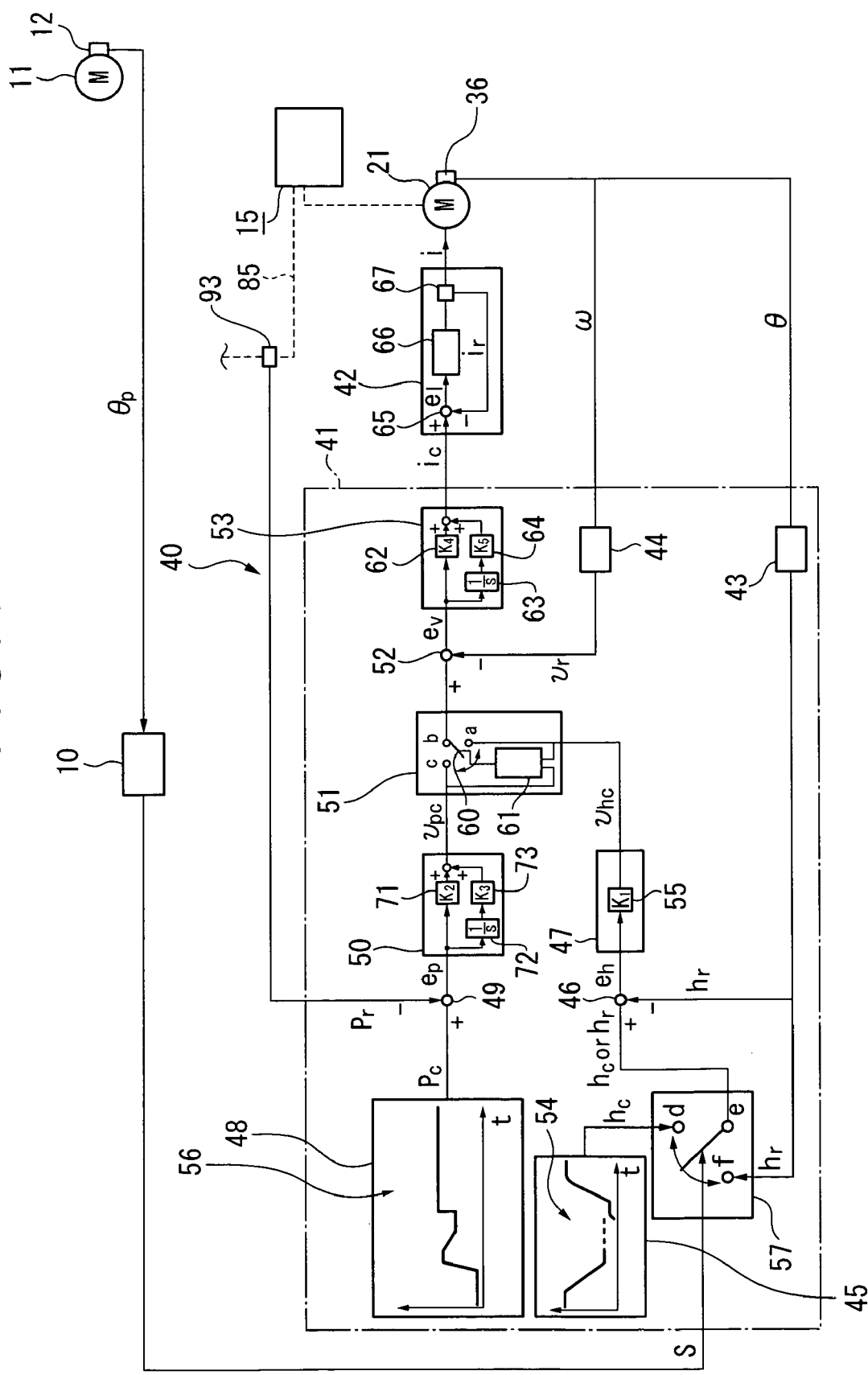
FIG. 4 is a control block diagram for explaining an arrangement of the die-cushion controlling device.

The die-cushion controlling device 40 shown in FIGS. 3 and 4 includes a controller 41 and a servo amplifier 42 for feeding the electric servo motor 21 with a motor current i corresponding to a motor-current command signal ic output from the controller 41.

The controller 41, a description of which by detailed illustration will be omitted herein, includes: an input interface for converting and shaping various input signals; a computer device mainly including a micro computer, a high-speed math coprocessor or the like for performing arithmetic or logic computation on input data in accordance with a predetermined procedure; and an output interface for converting the computed result into a control signal to output. The controller 41 is provided with various functional sections such as a die-cushion-pad-position calculating section 43, a die-cushion-pad-speed calculating section 44, a position-command-signal outputting section 45, a position comparing section 46, a position controlling section 47, a pressure-command-signal outputting section 48, a pressure comparing section 49, a pressure controlling section 50, a position/pressure-control switching section 51, a speed comparing section 52, a speed controlling section 53 and an output switching section 57. The above functional sections are formed by software or the like processed by the computer.

The die-cushion-pad-position calculating section 43: inputs the motor-rotary-angle detection signal $\theta$ from the encoder 36 provided to the electric servo motor 21; obtains a position of the die-cushion pad 15, which is in a predetermined relationship with the motor rotary angle, based on the input signal; and outputs the result as a die-cushion-pad-position detection signal hr (position detection signal).

The die-cushion-pad-speed calculating section 44: inputs the motor-rotation-angular speed detection signal $\omega$ from the encoder 36; obtains speed of the die-cushion pad 15 (elevating speed), which is in a predetermined relationship with the motor rotary speed, based on the input signal; and outputs the result as a die-cushion-pad speed detection signal vr.

The position-command-signal outputting section 45 obtains a target position value of the die-cushion pad 15 by referring to a predetermined position pattern 54, and generates and outputs a position command signal hc based on the obtained target position value. The position pattern 54 shows a desirable correspondence relationship between time (or press angles or slide positions) and die-cushion pad positions.

The position comparing section 46 compares the position command signal hc output from the position-command-signal outputting section 45 via an output switching section 57 with the die-cushion-pad-position detection signal hr from the die-cushion-pad-position calculating section 43 to output a position deviation signal eh.

The position controlling section 47, which includes a coefficient multiplier 55 for: inputting the position deviation signal eh from the position comparing section 46; multiplying the input signal by a predetermined position gain K1; and outputting the multiplied signal, generates and outputs a position-speed command signal vhc that has a value in correspondence with the value of the position deviation signal eh.

The pressure-command-signal outputting section 48 obtains a target value of a pressure (cushion pressure) applied on the die-cushion pad 15 by referring to a predetermined pressure pattern 56, and generates and outputs a pressure command signal Pc based on the obtained target pressure value. The pressure pattern 56 shows a desirable correspondence relationship between time (or press angles or slide positions) and pressures applied on the die-cushion pad 15.

The pressure comparing section 49 compares the pressure command signal Pc from the pressure-command-signal outputting section 48 with a pressure detection signal Pr from the pressure gauge 93 to output a pressure deviation signal ep.

The pressure controlling section 50, which includes: a coefficient multiplier 71 for inputting the pressure deviation signal ep from the pressure comparing section 49, multiplying the input signal by a predetermined proportional gain K2 and outputting the multiplied signal; an integrator 72 for inputting the pressure deviation signal ep from the pressure comparing section 49, integrating the input signal and outputting the integrated signal (a code "s" in the block denotes the Laplace operator); and a coefficient multiplier 73 for inputting the signal output from the integrator 72, multiplying the input signal by a predetermined integral gain K3 and outputting the multiplied signal, generates and outputs a pressure-speed command signal υpc by adding the output signal from the coefficient multiplier 71 with the output signal from the coefficient multiplier 73.

By carrying out PI action (a combination of proportional action (P action) and integral action (I action)), the pressure controlling section 50 outputs a pressure-speed command signal υpc having such a value that is in correspondence with the value of the pressure deviation signal ep and is increased as long as the pressure deviation signal ep is input thereinto. With this arrangement, the detected pressure is rapidly and accurately equalized with the target pressure.

The position/pressure-control switching section 51, which switches a control between a position control for controlling the position of the die-cushion pad 15 and a pressure control for controlling the pressure applied on the die-cushion pad 15, includes: a switch 60 for switching a connection between a connection of contacts (a) and (b) and a connection of contacts (c) and (b); and a position/pressure comparing section 61 for selecting the switching operations of the switch 60.

When the switch 60 connects the contact (b) with the contact (a) (this connecting operation is hereinafter called "contacts-(b)-to-(a) connecting operation"), the position-speed command signal υhc from the position controlling section 47 flows to the speed comparing section 52. When the switch 60 connects the contact (b) with the contact (c) (this connecting operation is hereinafter called "contacts-(b)-to-(c) connecting operation), the pressure-speed command signal υpc from the pressure controlling section 50 flows to the speed comparing section 52.

The position/pressure comparing section 61 is set to compare the pressure-speed command signal υpc from the pressure controlling section 50 with the position-speed command signal υhc from the position controlling section 47 and to select one having the smaller value of the two signals.

Figure 5:
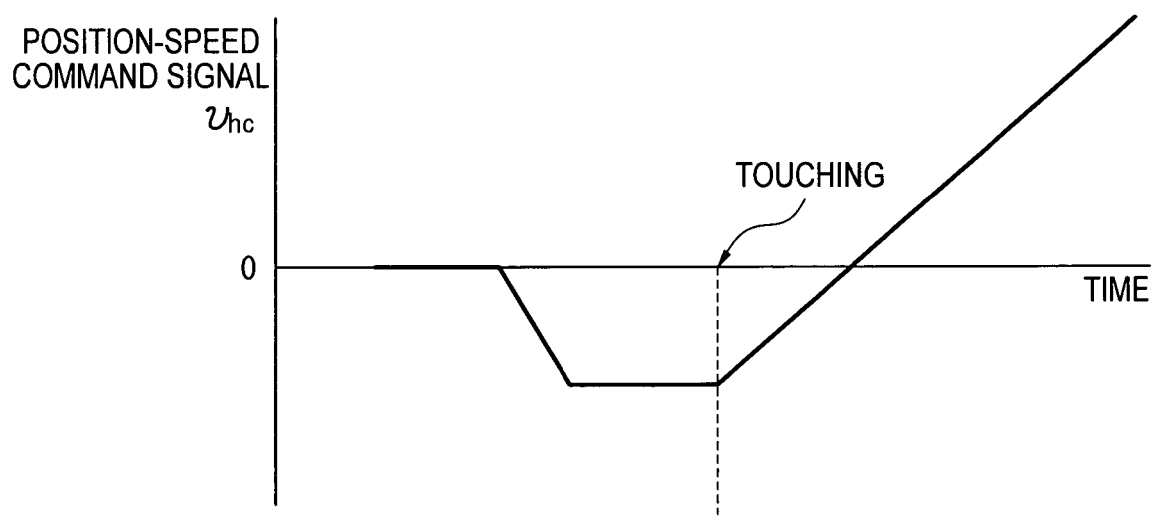
FIG. 5 shows a relationship between time and position-speed command signal.

Switching logic of the position/pressure comparing section 61 will be described with reference to FIGS. 5 to 7. FIG. 5 shows the position-speed command signal υhc. In FIG. 5, when the position pattern (target position value) of the die-cushion pad 15 is set constantly at 0 (stand-by position), the position of the die-cushion pad 15 before the upper die 7 contacts the workpiece 9 is identical with the stand-by position. Accordingly, the position deviation signal eh has a value of 0, so that the position-speed command signal υhc has a value of 0. Subsequently, after moving downward at a predetermined acceleration, the die-cushion pad 15 moves downward at a constant speed. Thus, the value of the position-speed command signal υhc is decreased from the value in the stand-by state at a predetermined time constant, and is subsequently maintained at a constant value. While the die-cushion pad 15 moves downward together with the slide 4 in actuality after the upper die 7 has reached a touch position during a preliminary acceleration, the position pattern 54 is set at a higher position than the actual position of the die-cushion pad 15. Therefore, the value of the position deviation signal eh is gradually increased upward, so that the value of the position-speed command signal υhc is also increased in accordance therewith.

Figure 6:
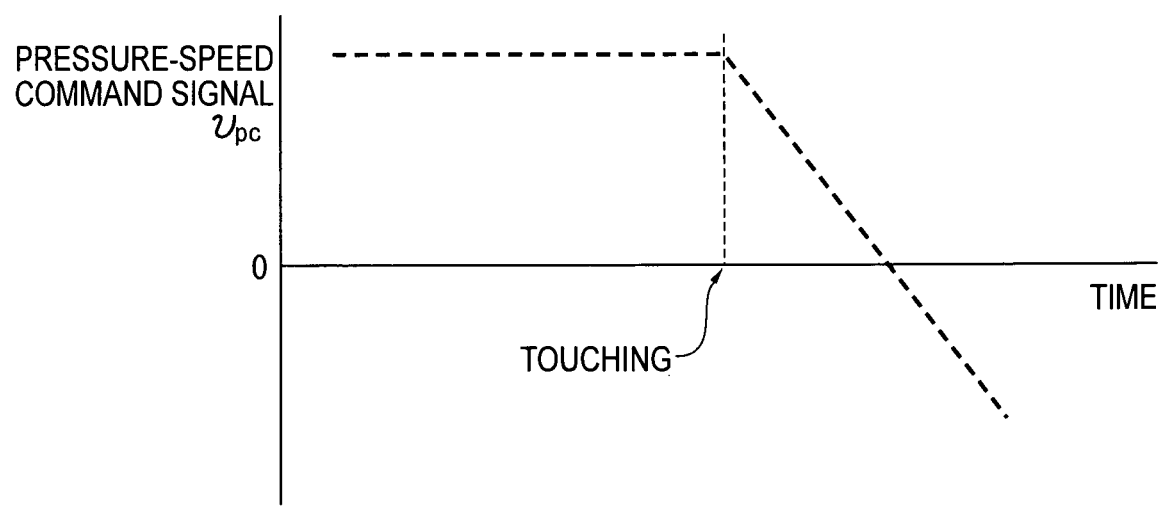
FIG. 6 shows a relationship between time and pressure-speed command signal.

FIG. 6 shows the pressure-speed command signal υpc. In FIG. 6, when the pressure pattern (target pressure value) of the die-cushion pad 15 is set constantly at a constant value, no pressure is applied on the die-cushion pad 15 before the upper die 7 contacts the workpiece 9. Accordingly, the value of the pressure deviation signal ep is identical with the constant value of the pressure pattern, so that the value of the pressure-speed command signal υpc corresponds to the constant value of the pressure pattern. When the upper die 7 has subsequently reached a position to contact the workpiece 9 (touch position), the upper die 7 presses the die-cushion pad 15, thereby applying the pressure thereto. The pressure is increased in accordance with the downward movement of the die-cushion pad 15 so as to approximate to the initially-set target pressure value. Therefore, the value of the pressure deviation signal ep is gradually decreased, so that the value of the pressure-speed command signal υpc is also decreased in accordance therewith.

Figure 7:
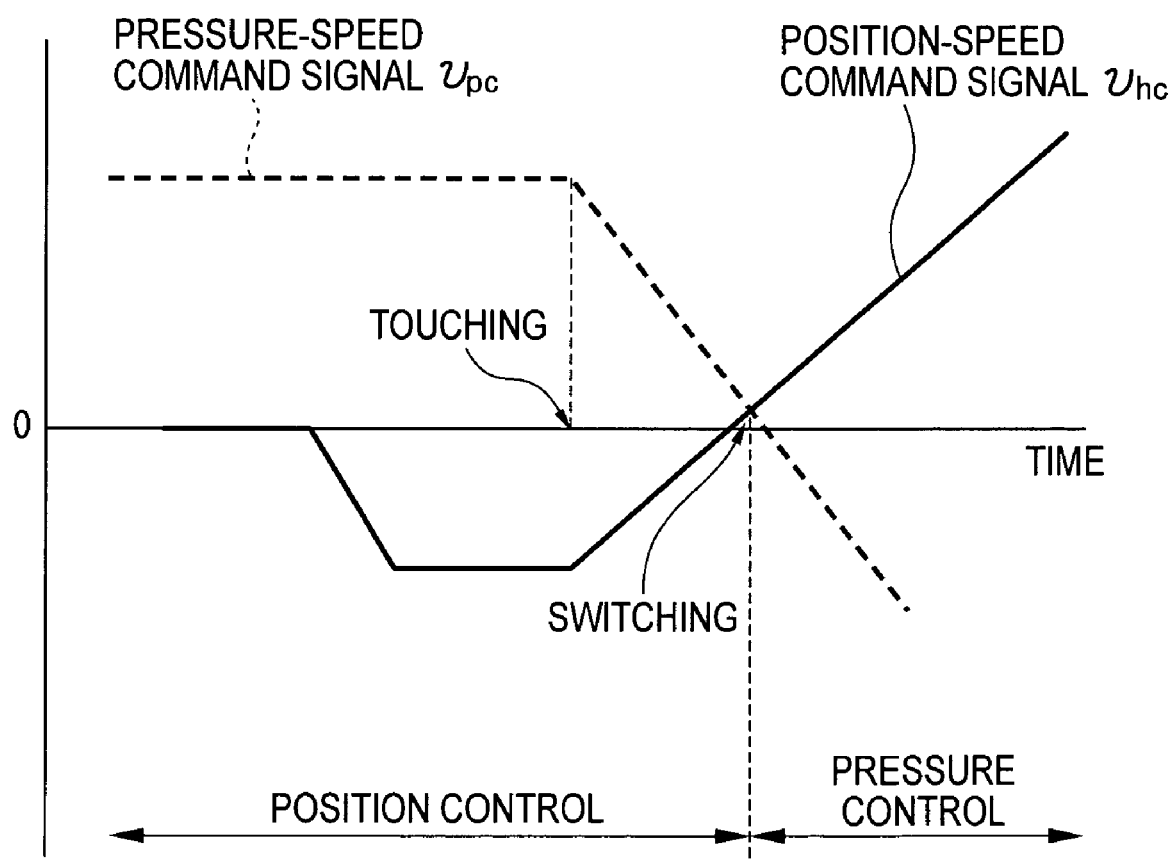
FIG. 7 is an illustration for explaining a switch operation for switching a control between a position control and a pressure control.

As shown in FIG. 7, the position/pressure comparing section 61 is set to compare the position-speed command signal υhc with the pressure-speed command signal υpc and to select one having the smaller value of the two signals. With this arrangement, during the downward movement of the die-cushion pad 15 before the upper die 7 contacts the workpiece 9, the position-speed command signal υhc is selected because the value of the position-speed command signal υhc is smaller than the value of the pressure-speed command signal υpc. By the above selection, the switch 60 connects the contact (b) with the contact (a), so that the position-speed command signal υhc flows to the speed comparing section 52, thereby conducting a position control.

When the upper die 7 has subsequently reached the touch position to contact the workpiece 9, the value of the position-speed command signal υhc is increased while the value of the pressure-speed command signal υpc is decreased. When the magnitude relation of the values of the speed command signals υhc, υpc is reversed, the position/pressure comparing section 61 selects the pressure-speed command signal υpc having a smaller value than the position-speed command signal υhc, so that the contacts (b) and (c) of the switch 60 are connected. By this operation of switching the connection, the pressure-speed command signal υpc flows to the speed comparing section 52, thereby conducting a pressure control.

Since the position/pressure comparing section 61 is set to constantly compare the position-speed command signal υhc with the pressure-speed command signal υpc so as to select the one having a smaller value of the two signals, the switch between the position control and the pressure control can be automatically performed at a suitable timing. Accordingly, influence (e.g., influence brought about by an impact, oscillation etc.) caused by the contact of the upper die 7 with the die-cushion pad 15 via the workpiece 9 can be minimized, and the switch between the position control and the pressure control can be stably and reliably performed at a suitable timing. In addition, since both the position-speed command signal υhc and the pressure-speed command signal υpc are constantly being observed, the touch position when the upper die 7 contacts the workpiece 9 can be reliably obtained. Thus, a rapid and reliable switch can be performed.

When the position control is selected as a result of the switching operation by the position/pressure-control switching section 51, the speed comparing section 52 compares the position-speed command signal υhc from the position controlling section 47 with the die-cushion-pad-speed detection signal or from the die-cushion-pad-speed calculating section 44, and outputs a speed deviation signal ev. When the pressure control is selected as a result of the switching operation by the position/pressure-control switching section 51 on the other hand, the speed comparing section 52 compares the pressure-speed command signal υpc from the pressure controlling section 50 with the die-cushion-pad-speed detection signal υr from the die-cushion-pad-speed calculating section 44, and outputs the speed deviation signal ev.

According to the present embodiment, when the pressure control is performed, the pressure controlling section 50 outputs the pressure-speed command signal υpc having such a value that is in correspondence with the value of the pressure deviation signal ep and is increased as long as the pressure deviation signal ep is input thereinto. With this arrangement, a pressure deviation can be rapidly and reliably reduced. Accordingly, accuracy of the pressure control can be enhanced.

The speed controlling section 53, which includes: a coefficient multiplier 62 for inputting the speed deviation signal ev from the speed comparing section 52, multiplying the input signal by a predetermined proportional gain K4 and outputting the multiplied signal; an integrator 63 for inputting the speed deviation signal ev from the speed comparing section 52, integrating the input signal and outputting the integrated signal (the code "s" in the block denotes the Laplace operator); and a coefficient multiplier 64 for inputting the signal output from the integrator 63, multiplying the input signal by a predetermined integral gain K5 and outputting the multiplied signal, generates and outputs a motor-current command signal ic (torque command signal) by adding the output signal from the coefficient multiplier 62 with the output signal from the coefficient multiplier 64.

By also carrying out PI action (a combination of proportional action (P action) and integral action (I action)), the speed controlling section 53 outputs a motor-current command signal ic that has such a value that is in correspondence with the value of the speed deviation signal ev and is increased as long as the speed deviation signal ev is input thereinto. With this arrangement, the detected speed is rapidly and accurately equalized with the target speed. In this manner, a stable position/pressure control can be performed.

The output switching section 57, which serves as a switch equipped with a timer which is switched for a predetermined time by a press signal S from a press-signal generating section 10 provided to the press machine 1, includes contacts (d), (e) and (f) in terms of the control block. At the time of a contacts-(e)-to-(d) connecting operation by which the contacts (e) and (d) are connected in the output switching section 57, the position command signal hc from the position-command-signal outputting section 45 is output to the position comparing section 46 as described above. On the other hand, at the time of a contacts-(e)-to-(f) connecting operation whereby the contacts (e) and (f) are connected in the output switching section 57, a die-cushion-pad-position detection signal hr from the die-cushion-pad-position calculating section 43 is output without change to the position comparing section 46. In other words, in the control program, the actual detection position is given as the target position value for the die-cushion pad 15.

The press signal S generated by the press-signal generating section 10 is related with positions of the slide, and generated based on a motor-rotary-angle signal θp from the encoder 12 provided on the servo motor 11 for driving the slide 4. In a time period during which the slide 4 moves from the top dead center to the bottom dead center, an ON signal is output as a press signal S, and in a time period from arrival at the bottom dead center to arrival at the top dead center, an OFF signal is output as a press signal S.

The servo amplifier 42 includes a current comparing section 65, a current controlling section 66 and a current detecting section 67. In the servo amplifier 42, the current detecting section 67 detects the motor current i fed to the electric servo motor 21 and outputs the detected value as a motor-current detection signal ir. The current comparing section 65 compares the motor-current command signal ic from the speed controlling section 53 with the motor-current detection signal ir from the current detecting section 67 to output a motor-current deviation signal ei. The current controlling section 66 controls the motor current i fed to the electric servo motor 21 based on the motor-current deviation signal ei from the current comparing section 65.

Figure 8:
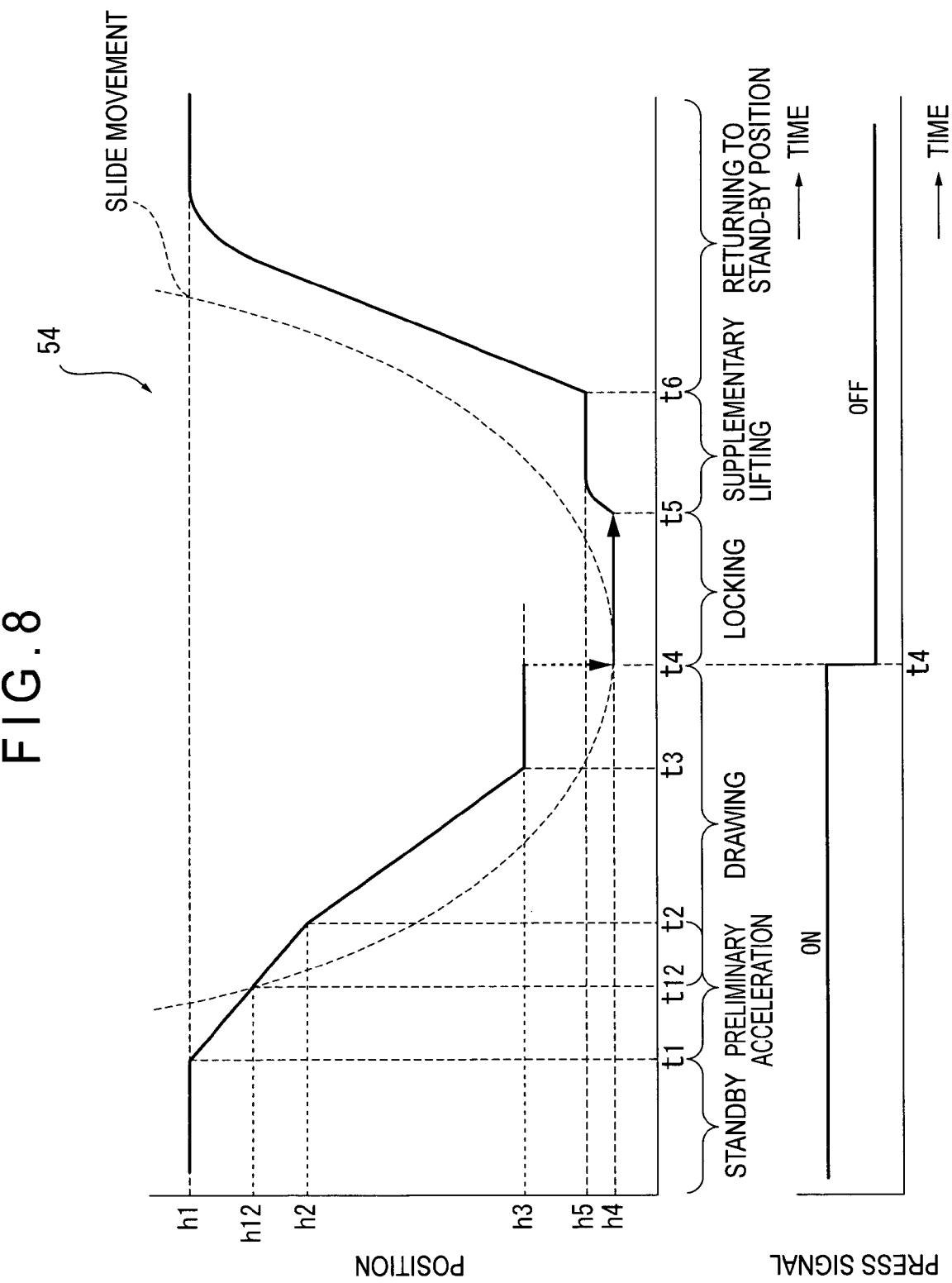
FIG. 8 shows a position pattern.
Figure 9:
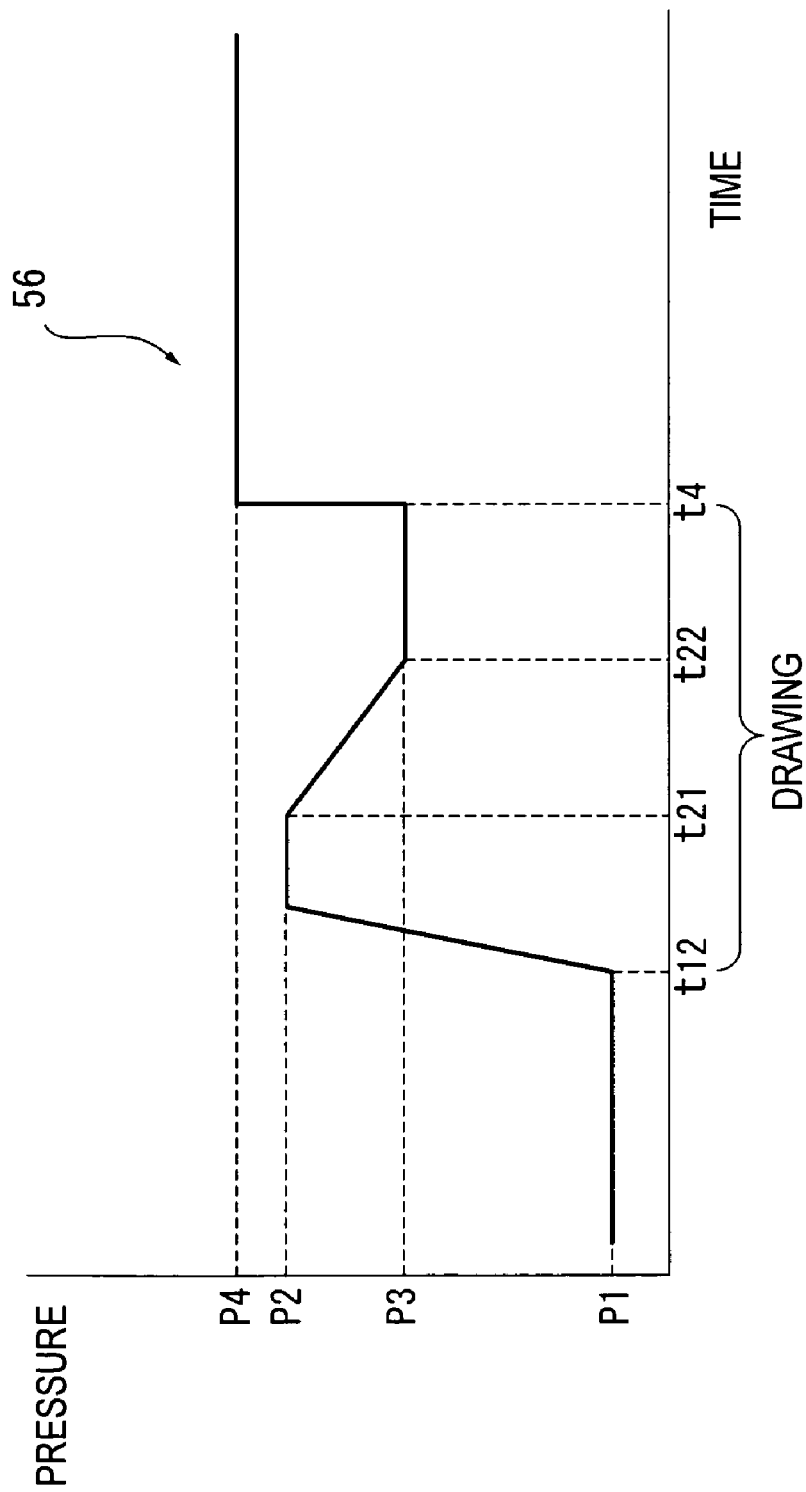
FIG. 9 shows a pressure pattern.

The position pattern 54 of the position-command-signal outputting section 45, the pressure pattern 56 of the pressure-command-signal outputting section 48 and the press signal S according to the present embodiment will be described in detail below. FIG. 8 shows the position pattern 54 and the press signal S according to the present embodiment in a manner that is associated with operations of the slide. FIG. 9 shows the pressure pattern 56 according to the present embodiment.

As shown in FIG. 8, the position pattern 54 is set such that: a position h1 equivalent to the stand-by position of the die-cushion pad 15 is initially maintained during a period until a time t1; and the position is subsequently lowered down to a position h2 by a predetermined time constant during a period from the time t1 to a time t2 due to a preliminary acceleration. Then, at a position h12 on the way to the position h2, the upper die 7 contacts the workpiece 9 (time t12). Since it is preferable to perform a pressure control when drawing is conducted with the upper die 7 contacting the workpiece 9, the target position value according to the position pattern 54 until a time t4 at which the slide 4 reaches the bottom dead center is set at a value higher than a value of the actual position of the die-cushion pad 15. With this arrangement, while the die-cushion pad 15 moves downward, the value of the position deviation signal eh is increased, so that the pressure deviation signal ep, which has a smaller value than the position deviation signal eh, is selected for the pressure control to be performed. According specifically to the position pattern 54 at this time, a position command signal hc for commanding the position to be lowered to a position h3 by another time constant during a period from the time t2 to a time t3 after the preliminary acceleration to the position h2 is output.

Then, during a period from the time t3 until the slide 4 reaches the bottom dead center, i.e., until an OFF signal as the press signal S is output from the press-signal generating section 10 to the output switching section 57, a position command signal hc for commanding the die-cushion pad 15 to stop at the position h3 is output. Since the die-cushion pad 15 follows the downward movement of the slide 4, when the slide 4 has reached the bottom dead center, the die-cushion pad 15 also stops at the position h4 (i.e., the own bottom dead center position of the die-cushion pad 15). At this time, since the stop position h4 is lower than the stop position h3 in terms of the target position value according to the position pattern 54, the die-cushion pad 15 stays at the position h4 while the position deviation signal eh having a certain value is output.

When an OFF signal as the press signal S is output at this time, switching to the contacts-(e)-to-(f) connecting operation is conducted by the output switching section 57, so that the die-cushion-pad-position detection signal hr (being the position h4 in actuality) is given as the position command signal hc for the die-cushion pad 15 at the bottom dead center. As a result, the die-cushion-pad-position detection signal hr is input to the position comparing section 46 from both the die-cushion-pad-position calculating section 43 and the output switching section 57, thereby causing the position deviation signal eh to be 0. In addition, at the bottom dead center where load vanishes, the target pressure value according to the pressure pattern 56 to be described next is determined at a high value. Accordingly, the value of pressure deviation signal ep exceeds the value of the position deviation signal eh, so that the control is switched to the position control. Furthermore, since the position deviation signal eh is followed up to be 0 even when the control is switched to the position control, the die-cushion pad 15 securely stays at the position h4, which is the own bottom dead center of the die-cushion pad 15.

Subsequently, in the output switching section 57, the contacts-(e)-to-(f) connecting operation is continued from the time t4 to a time t5 by the timer function, and locking is conducted with the die-cushion pad 15 continuing to stay at the bottom dead center. When the time t5 is passed by, in the output switching section 57, the contacts-(e)-to-(f) connecting operation is automatically returned to the contacts-(e)-to-(d) connecting operation, and the position command signal hc is output according to the predetermined position pattern 54. During a period from the time t5 to a time t6, in which a supplementary lifting operation for upwardly moving the die-cushion pad 15 by a predetermined height is performed, the die-cushion pad 15 is set to be positioned at the position h5 at the time t6. During a period subsequent to the time t6, the die-cushion pad 15 is set to return to the position h1 equivalent to the stand-by position.

As shown in FIG. 9, according to the pressure pattern 56, a predetermined value P1 is set during a period until the time t12, which precedes the contacting of the upper die 7 with the workpiece 9. The predetermined value P1 is set at a value higher by a predetermined ratio than a value of precompression of the die-cushion pad 15. With this arrangement, a predetermined pressure deviation signal ep is generated during a period before the upper die 7 contacts the workpiece 9. During a period from the time t12 to the time t4 in which the upper die 7 contacts the workpiece 9 to conduct drawing, the pressure pattern 56 is set such that an optimum pressure is applied during each time period.

Specifically, when drawing is started, the target pressure value is diagonally increased from the predetermined value P1 to a predetermined P2 by a predetermined time constant, and maintains the predetermined value P2 during a period until a time t21. Then, during a period from the time t21 to a time t22, the target pressure value is diagonally decreased from the predetermined value P2 to a predetermined value P3 by a predetermined time constant, and maintains the predetermined value P3 during a period from the time t22 to the time t4 (i.e., a period until the slide 4 reaches the bottom dead center). Since it is preferable to perform the position control after the slide 4 has reached the bottom dead center (subsequent to the time t4), the target pressure value is set to jump to a high value of a predetermined value P4 so that the value of the pressure deviation signal ep is increased.

Figure 10:
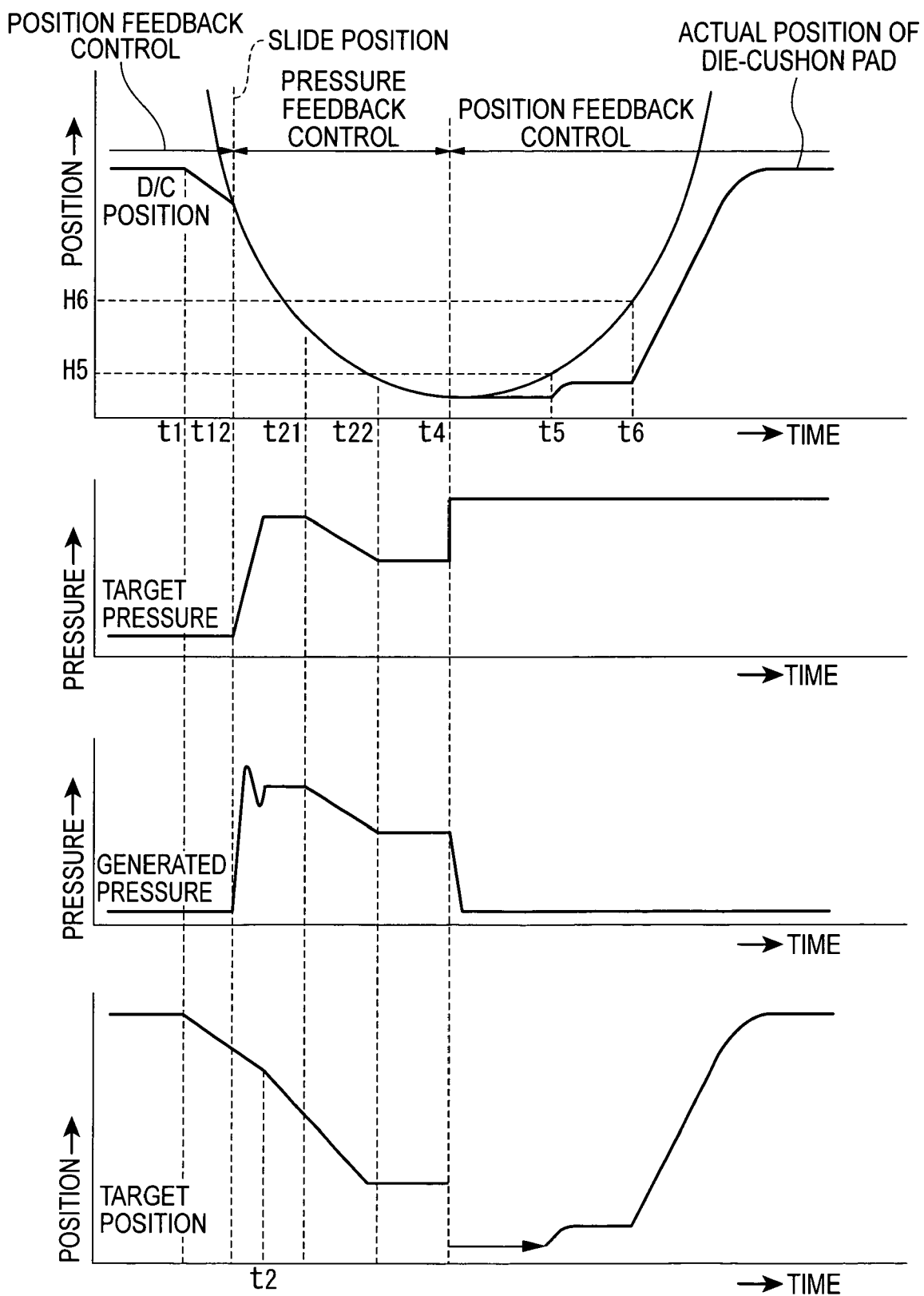
FIG. 10 is an illustration for explaining movements of a slide and a die-cushion pad.

Next, a relationship between the movement of the die-cushion pad 15 and the pressure/position control will be described below. FIG. 10 shows an illustration for explaining movements of the slide 4 and the die-cushion pad 15, in which positional variations of the slide 4 and the die-cushion pad 15 in accordance with lapse of time are illustrated by lines.

It should be noted that, in the description below, the die-cushion-pad-position detection signal hr from the die-cushion-pad-position calculating section 43 will be referred to as "position feedback signal hr", the die-cushion-pad-speed detection signal υr from the die-cushion-pad-speed calculating section 44 will be referred to as "speed feedback signal υr" and the pressure detection signal Pr from the pressure gauge 93 will be referred to as "pressure feedback signal Pr". In addition, the position control will be referred to as "position feedback control" while the pressure control will be referred to as "pressure feedback control".

Initially, the die-cushion pad 15 is positioned at the position h1 (i.e., stand-by position) during a period until the time t1 since the press work is started. Thus, the value of the position-speed command signal υhc is 0 while the value of the pressure-speed command value υpc corresponds to the predetermined value P1. Accordingly, during the period until the time t1 since the drawing operation is started, the position/pressure comparing section 61 selects the position-speed command signal υhc, and the switch 60 connects the contact (b) with the contact (a), so that the position feedback control is performed. In addition, the value of the pressure-speed command signal υpc also corresponds to the predetermined value P1 during the period from the time t1 to the time t12, so that the position feedback control continues to be performed.

In the position feedback control, the position comparing section 46 subtracts the value of the position feedback signal hr from the value of the position command signal hc and outputs the position deviation signal eh, the position controlling section 47 outputs the position-speed command signal υhc for decreasing the value of the position deviation signal eh, the speed comparing section 52 subtracts the value of the speed feedback signal υr from the value of the position-speed command signal υhc and outputs the speed deviation signal ev, the speed controlling section 53 outputs the motor-current command signal ic (torque command signal) for decreasing the value of the speed deviation signal ev, and the servo amplifier 42 feeds the electric servo motor 21 with the motor current i corresponding to the motor-current command signal ic. With this operation, the position of the die-cushion pad 15 is controlled so that the position detection value detected by the encoder 36 follows the predetermined position pattern 54.

With this operation, the die-cushion pad 15 is on standby at the stand-by position during the period until the time t1. Then, in order to mitigate an impact caused when the upper die 7 contacts the workpiece 9, the preliminary acceleration of the die-cushion pad 15 is conducted during the period from the time t1 to the time t2.

The upper die 7 subsequently contacts the workpiece 9 at the position h12 at the time t12 during the preliminary acceleration. The target position value according to the position pattern 54 keeps varying in the same manner toward the position h2, and subsequently varies toward the position h3. However, since the die-cushion pad 15 in actuality moves further downward than the target position, the position deviation signal eh with a certain value or more is output. On the other hand, the pressure is increased due to the contact of the upper die 7 with the workpiece 9, so that the value of the generated pressure approximates to the predetermined value P1 (i.e., the target pressure value according to the pressure pattern 56). Accordingly, the value of the pressure deviation signal ep is gradually decreased. When the value of the pressure-speed command signal υpc based on the pressure deviation signal ep has become smaller than the value of the position-speed command signal υhc based on the position deviation signal eh, the position/pressure comparing section 61 selects the pressure-speed command signal υpc.

With this operation, the switch 60 connects the contact (b) and the contact (c) by the contacts-(b)-to-(c) connecting operation in the position/pressure-control switching section 51, so that the control is automatically switched to the pressure feedback control from the position feedback control. Accordingly, owing to the automatic switching operation of the position/pressure-control switching section 51, the control can be reliably switched between the position control and the pressure control immediately after the upper die 7 contacts the workpiece 9. With the above operations, the slide 4 and the die-cushion pad 15 move downward in an integrated manner during the period from the time t12 to the time t4, so that the workpiece 9 experiences the drawing. During this period from the time t12 to the time t4, the pressure feedback control is performed.

In the pressure feedback control, the pressure comparing section 49 subtracts the value of the pressure feedback signal Pr from the value of the pressure command signal Pc and outputs the position deviation signal ep, the pressure controlling section 50 outputs the pressure-speed command signal υpc for decreasing the value of the pressure deviation signal ep, the speed comparing section 52 subtracts the value of the speed feedback signal or from the value of the pressure-speed command signal υpc and outputs the speed deviation signal ev, the speed controlling section 53 outputs the motor-current command signal ic (torque command signal) for decreasing the value of the speed deviation signal ev, and the servo amplifier 42 feeds the electric servo motor 21 with the motor current i corresponding to the motor-current command signal ic. With this operation, the cushion pressure of the die-cushion pad 15 is controlled so that the pressure detection value detected by the pressure gauge 93 follows the predetermined pressure pattern 56.

Then, the slide 4 and the die-cushion pad 15 reach the dead bottom center at the time t4. The target pressure value of the pressure pattern 56 jumps up to the predetermined value P4 to increase the pressure deviation signal ep. On the other hand, by the operation of the output switching section 57, the position command signal hc based on the position pattern 54 becomes identical to the position feedback signal hr (in actuality, the position h4) that corresponds to the bottom dead center at which the die-cushion pad actually stays. Accordingly, a state of the position command signal hc=hr is achieved, so that the position deviation signal eh at the position comparing section 46 is followed up to 0. Consequently, the position-speed command signal υhc based on the position deviation signal eh becomes smaller than the pressure-speed deviation signal υpc based on the pressure deviation signal ep. The position-speed command signal υhc is selected in the position/pressure comparing section 61. With this operation, the switch 60 connects the contact (b) and the contact (a) by the contacts-(b)-to-(a) connecting operation in the position/pressure-control switching section 51, so that the control is automatically switched to the position feedback control from the pressure feedback control. In addition, the target position of the die-cushion pad 15 at the bottom dead center is replaced by the position h4 at which the die-cushion pad 15 in the bottom-dead-center state is actually staying. Thus, in terms of position control, the die-cushion pad 15 can be securely stopped at the bottom dead center position according to the target position, thereby realizing an accurate bottom dead center locking.

Figure 11:
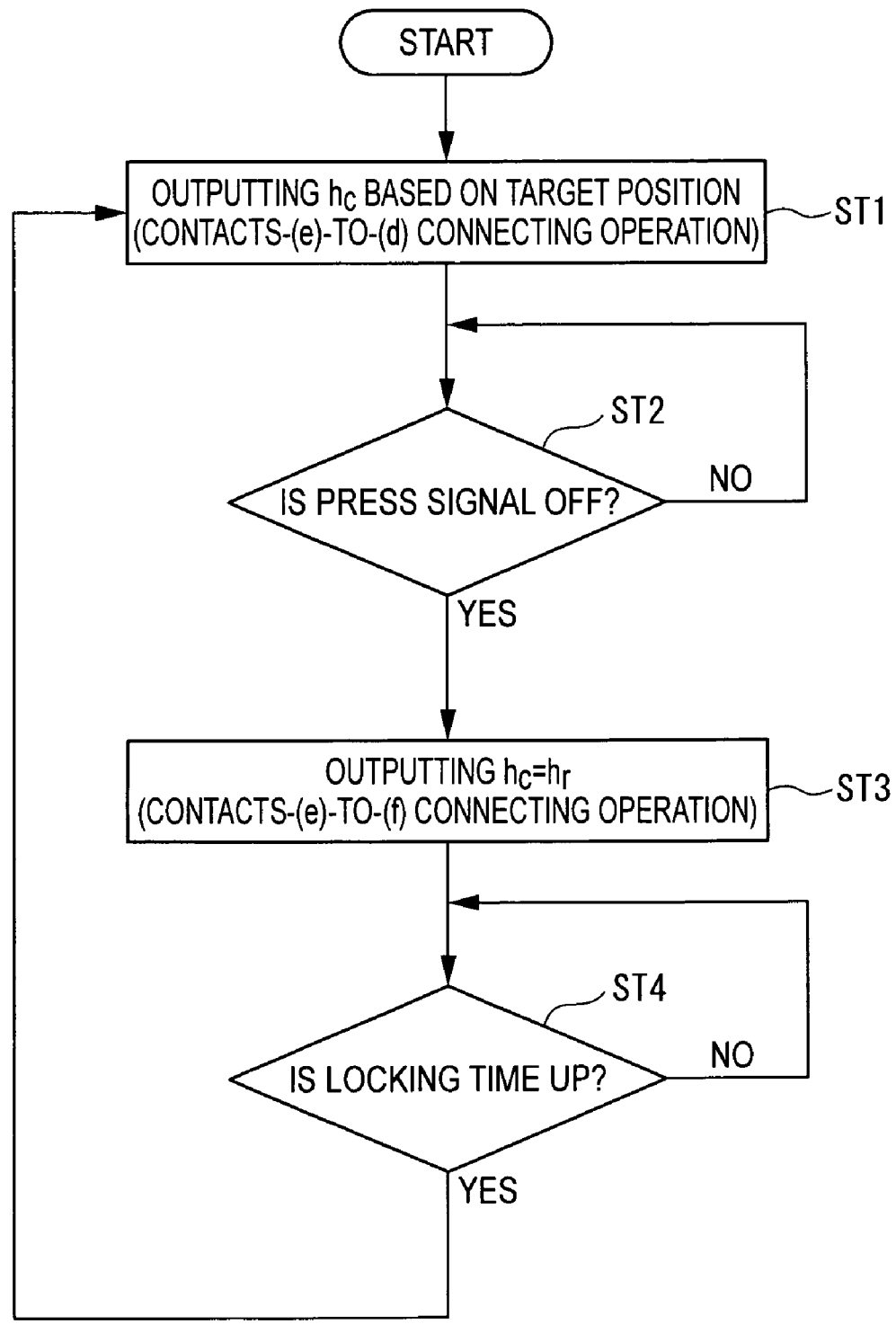
FIG. 11 is an illustration for explaining an operation of an output switching section.

Now, with reference to a flowchart shown in FIG. 11, the operation of the output switching section 57 will be described in more detail. In FIG. 11, since the press-signal generating section 10 outputs the ON signal as the press signal during a period in which the slide 4 is between the top dead center and the bottom dead center, the output switching section 57 during a period in which the ON signal is input therein performs the contacts-(e)-to-(d) connecting operation, and outputs the position command signal hc based on the target position according to the position pattern 54 (ST1). The position command signal hc is output for commanding the die-cushion pad 15 to remain positioned at the position h3 when the die-cushion pad 15 has reached the position h3, so that the output switching section 57 waits for the input of the OFF signal as the press signal S (ST2). When the slide 4 reaches the bottom dead center position at the time t4, the press signal S is altered from the ON signal to the OFF signal, so that the OFF signal is input to the output switching section 57. Then, the operation is switched to the contacts-(e)-to-(f) connecting operation in the output switching section 57. The position feedback signal hr (being the position h4 in actuality) is given as the position command signal hc. The position deviation signal eh is followed up to be 0 (ST3). Such a contacts-(e)-to-(f) connecting operation continues by the timer function of the output switching section 57 until the time t5, while the locking is conducted. When the time is up and passes by the time 5, the output switching section 57 conducts switching to the contacts (e)-to-(f) connecting operation regardless of the press signal S being an OFF signal. The position command signal hc based on the target position according to the position pattern 54 is output.

Referring back to FIG. 10, as described above, since the position deviation signal eh is followed up to be 0 during the period from the time t4 to the time t5, the die-cushion pad 15 accurately performs locking at the position h4 (the actual bottom dead center position of the die-cushion pad 15), and temporarily stops its upward movement. During the period of the time t5 to the time t6, the die-cushion pad 15 moves upward by an amount of the supplementary lifting. At the time t6, the die-cushion pad 15 resumes its upward movement, and stops the upward movement after returning to the stand-by position h1. During the period subsequent to the time t4, the position feedback control is performed. By flows of various signals as described above, the position of the die-cushion pad 15 is controlled so that the position detection value detected by the encoder 36 follows the predetermined position pattern 54.

Figure 12:
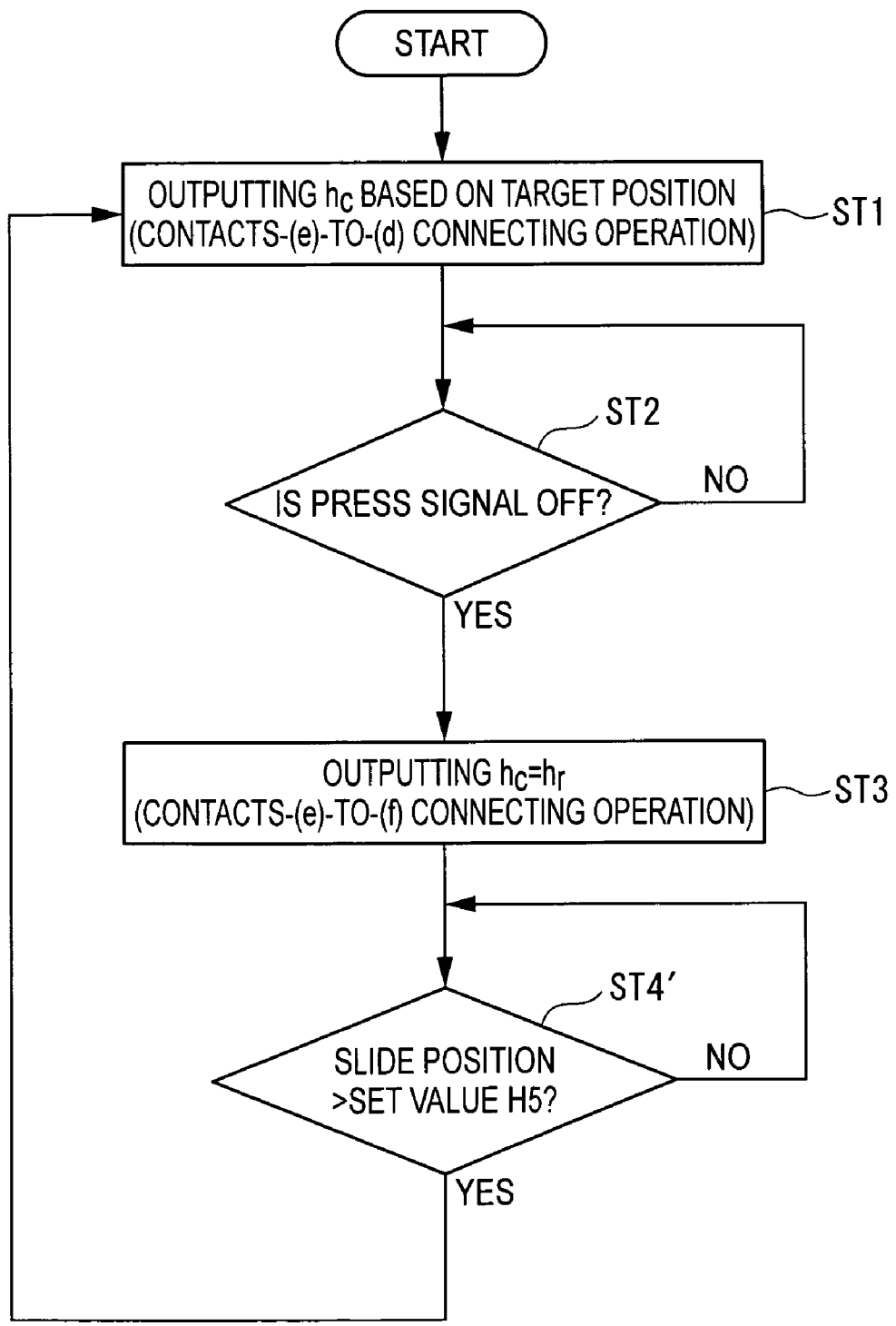
FIG. 12 is an illustration for explaining a modification of the operation of the output switching section.

While transition from the bottom dead center locking to the supplementary lift operation is conducted based on the timer function for determining whether or not the time t5 has been reached according to the present embodiment, transition from the locking to the supplementary lift operation may be conducted based on the press signal S generated when the height position of the slide 4 in an elevating process reaches a set value H5 (FIG. 10). The above description corresponds to a determination at ST4' of the flowchart in FIG. 12. Furthermore, the transition from the supplementary lifting to the elevation need not be triggered based on whether or not the time t6 is reached. Based on the press signal S generated when the height position of the slide 4 reaches the set value H6, the transition may be triggered as well.

It should be noted that, although the best structure, method and the like for implementing the present invention have been described in the above description, the present invention is not limited to the above description. Specifically, while the present invention has been described above with a specific embodiment(s) being particularly illustrated and mainly described, those skilled in the art may make various modifications to the above-described embodiments in terms of a shape, quantity or any other detailed configuration without departing from a scope of a technical idea and an object of the present invention.

Thus, a shape, quantity and the like described above merely serve as exemplifying the present invention for facilitating an understanding of the present invention, and do not serve as any limitations on the present invention, so that what is described by a name of a component for which the description of the shape, quantity and the like are partially or totally omitted is also included in the present invention.

For instance, while the pressure gauge provided in the hydraulic circuit is used as the pressure detecting means according to the present invention in the above embodiment, the pressure detecting means may be a strain gauge or the like provided on a lateral surface of the die-cushion pad. In addition, the position detecting means is also not limited to the encoder provided on the electric servo motor for driving the die cushion but may be a linear scale provided between the die-cushion pad and the bed. Further, the electric servo motor is not limited to the rotary servo motor but may be a linearly-moving servo motor such as a linear servo motor.

While the die-cushion controlling device switches the control between the position control and the pressure control in the above embodiment, it is only required that at least the position control be performed at the bottom dead center position. An arrangement in which the position control is performed through a stroke is also included in the present invention.

The invention claimed is:

1. A die-cushion controlling device for a press machine, comprising:
   a position-command-signal outputting section that outputs a position command signal corresponding to a target position value of a die-cushion pad;
   a position detector that detects a position of the die-cushion pad;
   a position comparing section that outputs a position deviation signal corresponding to a deviation between the target position value based on the position command signal and a position detection value based on a position detection signal from the position detector;
   a position controlling section that outputs a position-speed command signal based on the position deviation signal;
   a speed controlling section that outputs a motor-current command signal based on the position-speed command signal from the position controlling section;
   a servo amplifier that feeds an electric servo motor for driving a die cushion with a current corresponding to the motor-current command signal; and
   an output switching section that, based on a press signal that is outputted at a timing when a slide of the press machine reaches a bottom dead center position, switches the position detection signal from the position detector for the position command signal from the position-command-signal outputting section so that the position comparing section receives the position detection signal instead of the position command signal.

2. The die-cushion controlling device for a press machine according to claim 1, further comprising:
   a pressure-command-signal outputting section that outputs a pressure command signal corresponding to a target pressure value;
   a pressure detector that detects a pressure applied on the die-cushion pad;
   a pressure comparing section that outputs a pressure deviation signal corresponding to a deviation between the target pressure value based on the pressure command signal and a pressure detection value based on a pressure detection signal from the pressure detector;
   a pressure controlling section that outputs a pressure-speed command signal based on the pressure deviation signal; and
   a position/pressure-control switching section that selects one having a smaller value of the pressure-speed command signal and the position-speed command signal,
   wherein the speed control section outputs a motor current command signal based on the pressure-speed command signal when the pressure-speed command signal is outputted from the position/pressure-control switching section.

* * * * *